(12) United States Patent
Hasegawa

(10) Patent No.: US 7,321,976 B2
(45) Date of Patent: Jan. 22, 2008

(54) INFORMATION PROCESSING APPARATUS, POWER SUPPLY CONTROL METHOD FOR PLURAL INFORMATION PROCESSING APPARATUSES, AND STORAGE MEDIUM THEREFORE

(75) Inventor: Toshitaka Hasegawa, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 10/082,176

(22) Filed: Feb. 26, 2002

(65) Prior Publication Data
US 2003/0074592 A1    Apr. 17, 2003

(30) Foreign Application Priority Data
Oct. 15, 2001  (JP)  ............................. 2001-316439

(51) Int. Cl.
*G06F 1/00*  (2006.01)
(52) U.S. Cl. ....................................... 713/330; 713/300
(58) Field of Classification Search ................ 713/300, 713/310, 320, 323, 330
See application file for complete search history.

(56) References Cited

U.S. PATENT DOCUMENTS

| | | | |
|---|---|---|---|
| 5,666,538 A | | 9/1997 | Denicola et al. |
| 5,809,223 A | | 9/1998 | Lee et al. |
| 5,867,716 A | * | 2/1999 | Morimoto et al. .......... 713/310 |
| 5,937,201 A | | 8/1999 | Matsushita et al. .... 395/750.02 |
| 5,983,353 A | * | 11/1999 | McHann, Jr. ............... 713/310 |
| 6,014,669 A | * | 1/2000 | Slaughter et al. ............. 707/10 |
| 6,044,476 A | * | 3/2000 | Ote et al. ..................... 714/31 |
| 6,189,108 B1 | * | 2/2001 | Cromer et al. .............. 713/340 |
| 6,336,161 B1 | * | 1/2002 | Watts ........................ 711/103 |
| 6,408,397 B1 | * | 6/2002 | Alexander et al. .......... 713/340 |
| 6,421,782 B1 | * | 7/2002 | Yanagisawa et al. ....... 713/201 |
| 6,473,607 B1 | * | 10/2002 | Shohara et al. .......... 455/343.1 |
| 6,477,361 B1 | * | 11/2002 | LaGrotta et al. ......... 455/343.1 |
| 6,526,507 B1 | * | 2/2003 | Cromer et al. .............. 713/162 |

(Continued)

FOREIGN PATENT DOCUMENTS

EP    0499564 A2    8/1992

(Continued)

OTHER PUBLICATIONS

Yasunori Aramaki, "Method and System for Automatically Operating Computer and Recording Medium for Programming and Recording the Method", Dec. 14, 1999, Japanese Publication H11-345048.*

(Continued)

*Primary Examiner*—Rehana Perveen
*Assistant Examiner*—Tse Chen
(74) *Attorney, Agent, or Firm*—Staas & Halsey LLP

(57) ABSTRACT

A representative computer requests performing a power-down process to other computer and notifies each of other computers of a next power-up date and time each time a power-down date and time comes, and has each power supply control device to enter the date and time. Each time a power-up date and time comes, the representative computer powered up and activated by its own power supply control device normally instructs each power supply control device of each of other computers. However, if the representative computer cannot be activated for any reason, each power supply control device powers up its own computer when the entered next power-up date and time comes.

15 Claims, 13 Drawing Sheets

U.S. PATENT DOCUMENTS

| | | | |
|---|---|---|---|
| 6,741,442 B1 * | 5/2004 | McNally et al. | 361/166 |
| 6,822,432 B2 * | 11/2004 | Hilleary | 324/72 |
| 2003/0065961 A1 * | 4/2003 | Koenen | 713/323 |

FOREIGN PATENT DOCUMENTS

| | | |
|---|---|---|
| EP | 000499564 A2 * | 8/1992 |
| EP | 0 777 172 | 6/1997 |
| EP | 0 936 532 | 8/1999 |
| JP | 58-006643 | 1/1983 |
| JP | A-59-153221 | 9/1984 |
| JP | 02-021316 | 1/1990 |
| JP | 03-265018 | 11/1991 |
| JP | 06-337738 | 12/1994 |
| JP | A-6-342324 | 12/1994 |
| JP | 09-062405 | 3/1997 |
| JP | A-9-97241 | 4/1997 |
| JP | 11-345048 | 12/1999 |

OTHER PUBLICATIONS

Search Report for corresponding European Appln. No. 02251714.8 dated Sep. 30, 2005.

Notice of Rejection Grounds mailed Jan. 9, 2007 for the corresponding Japanese Patent Application.

Office Action mailed Aug. 21, 2007, with corresponding Korean Application No. 10-2002-12713.

* cited by examiner

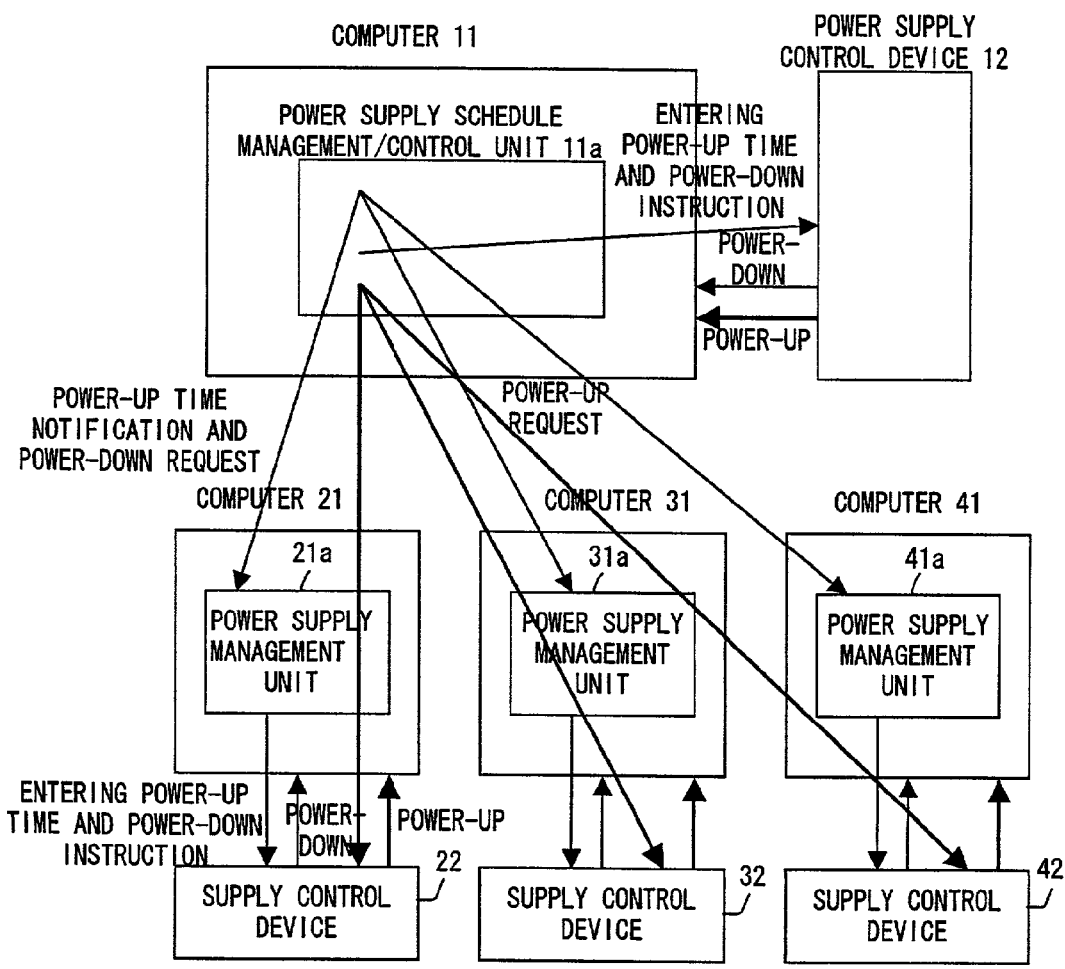
F I G. 3

SCHEDULE DEFINITION 50

| STARTUP/POWER-DOWN TIME 51 | STARTUP AT 6:00 EVERY DAY | POWER-DOWN AT 20:00 EVERY DAY | |
|---|---|---|---|

COMPUTER NAME 52 TO BE CONTROLLED IN SYNCHRONIZATION

| COMPUTER NAME (52a) | STARTUP INTERVAL (52b) | POWER-DOWN INTERVAL (52c) | IP ADDRESS OF SUPPLY CONTROL DEVICE (52d) |
|---|---|---|---|
| COMPUTER 21 | 3 MINUTES | — | 121. -121. 23. 45 |
| ↓ | | | |
| COMPUTER 31 | 2 MINUTES | 0 MINUTE | 121. -121. 23. 47 |
| ↓ | | | |
| COMPUTER 41 | — | 1 MINUTE | 121. -121. 23. 49 |

EVENT NAME 53 WAITING FOR SHUTDOWN

| COMPUTER NAME (53a) | EVENT NAME (53b) |
|---|---|
| COMPUTER 21 | END OF DATABASE |
| COMPUTER 31 | END OF OPERATION JOB |
| COMPUTER 41 | END OF OPERATION JOB |

F I G. 4 A

54

| COMPUTER NAME | STARTUP INTERVAL | POWER-DOWN INTERVAL | IP ADDRESS OF SUPPLY CONTROL DEVICE |
|---|---|---|---|
| COMPUTERB | 3 | 0 | 121. -121. 23. 45 |
| COMPUTERC | 2 | 0 | 121. -121. 23. 47 |
| COMPUTERD | 0 | 1 | 121. -121. 23. 49 |

F I G. 4 B

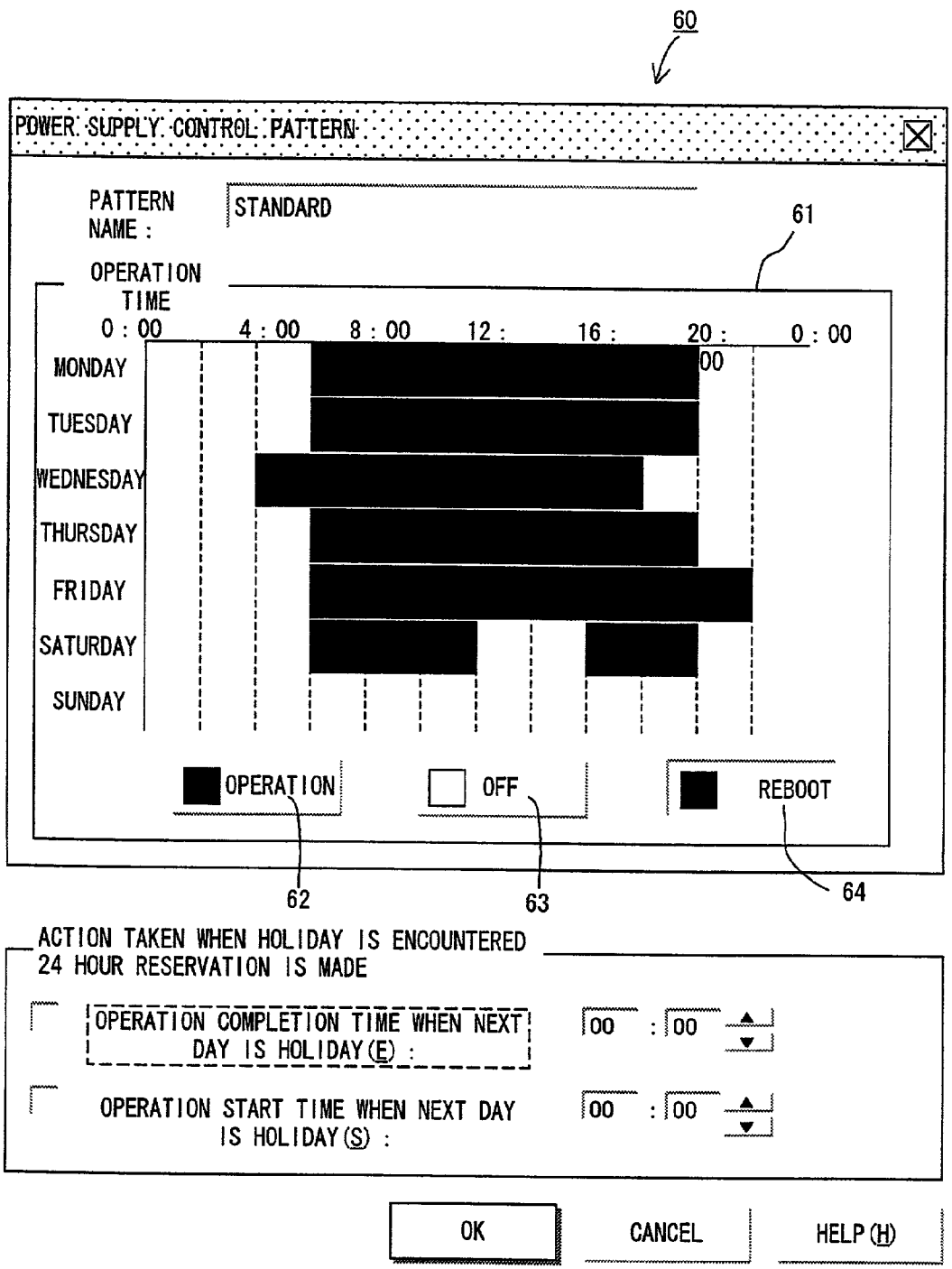
F I G. 5

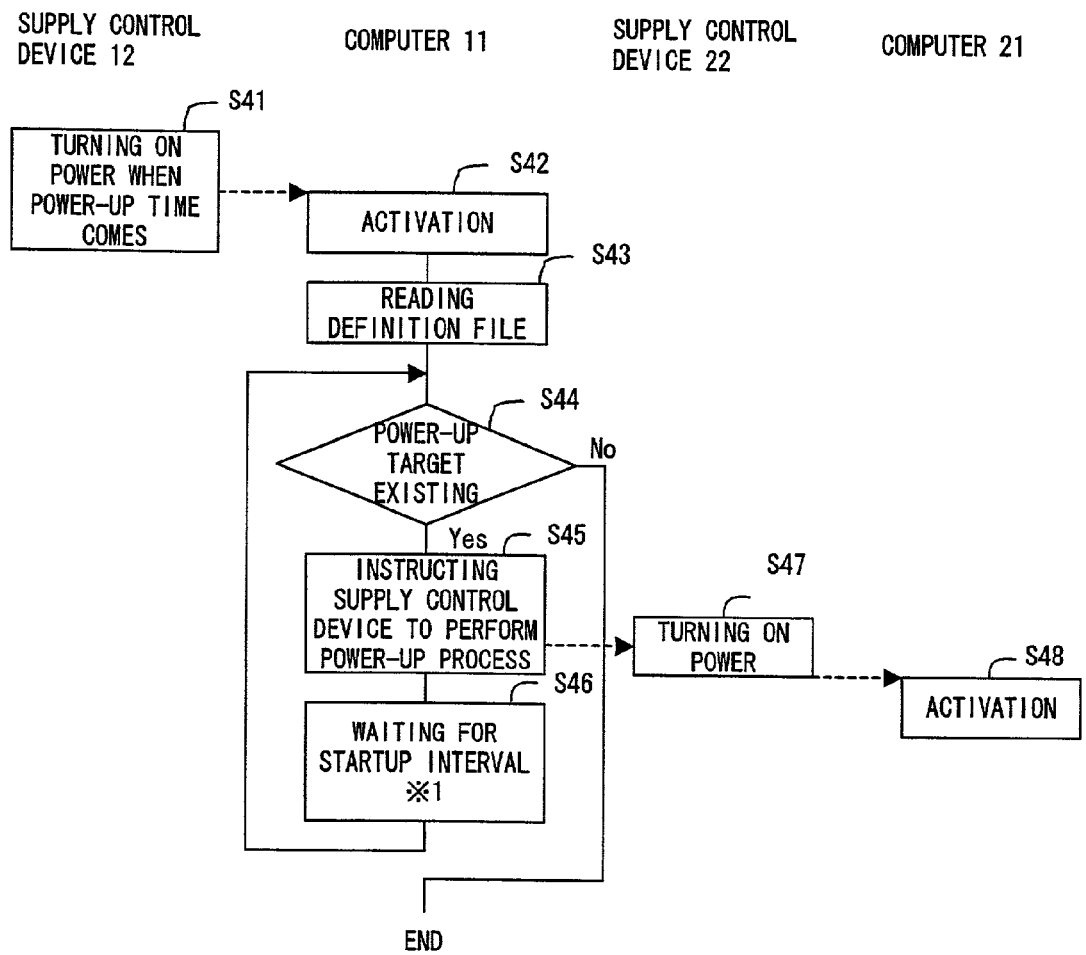
F I G. 8

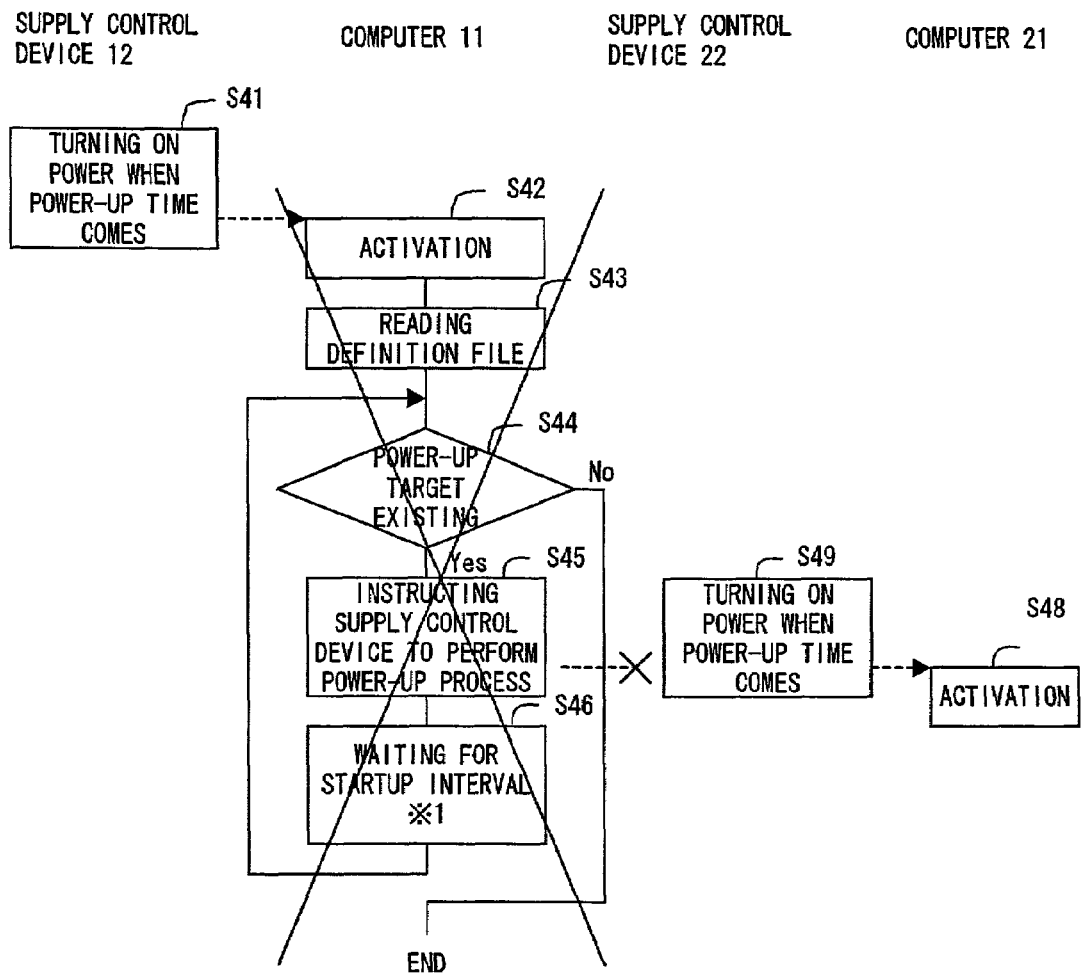
F I G. 9

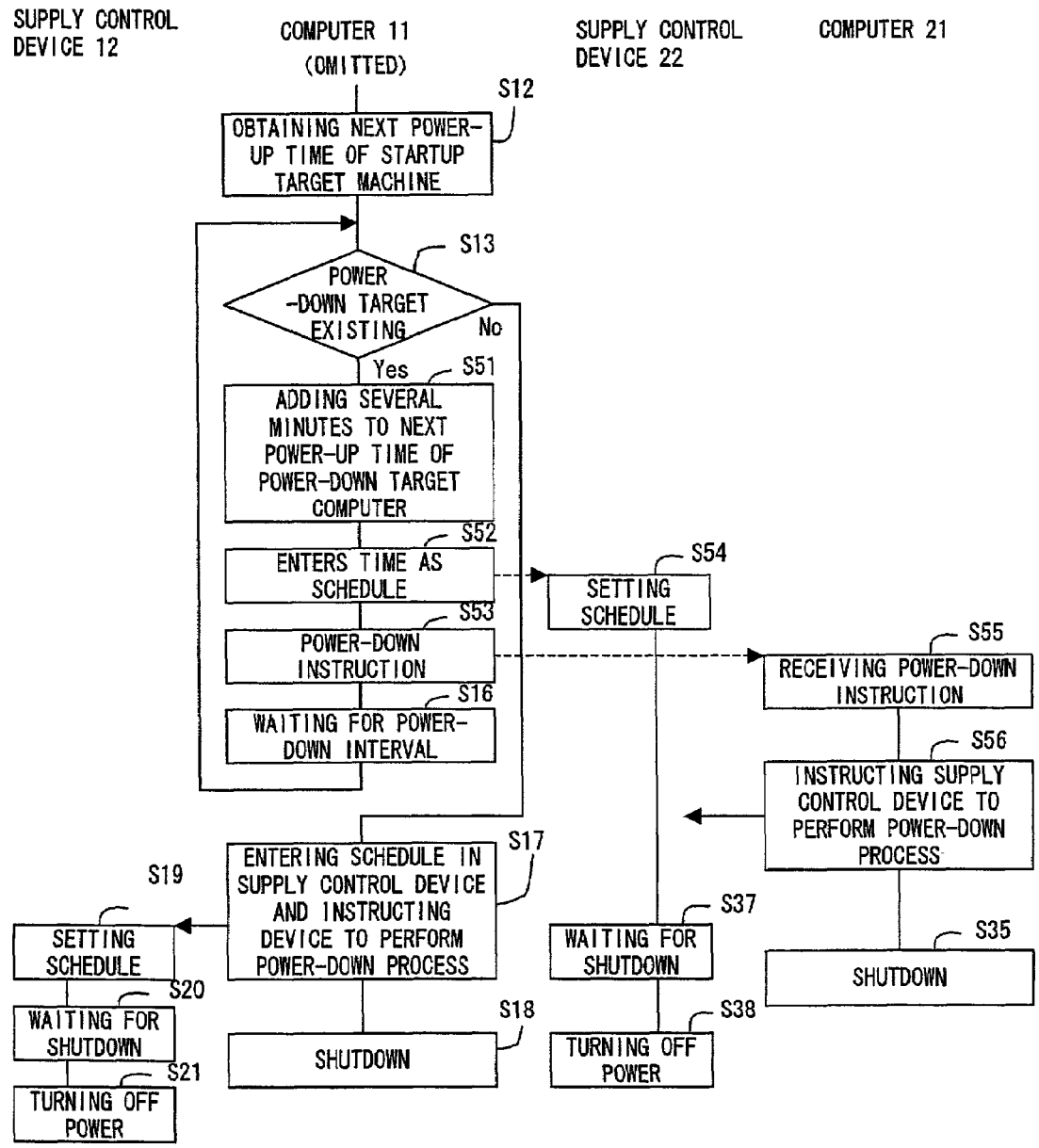
F I G. 1 1

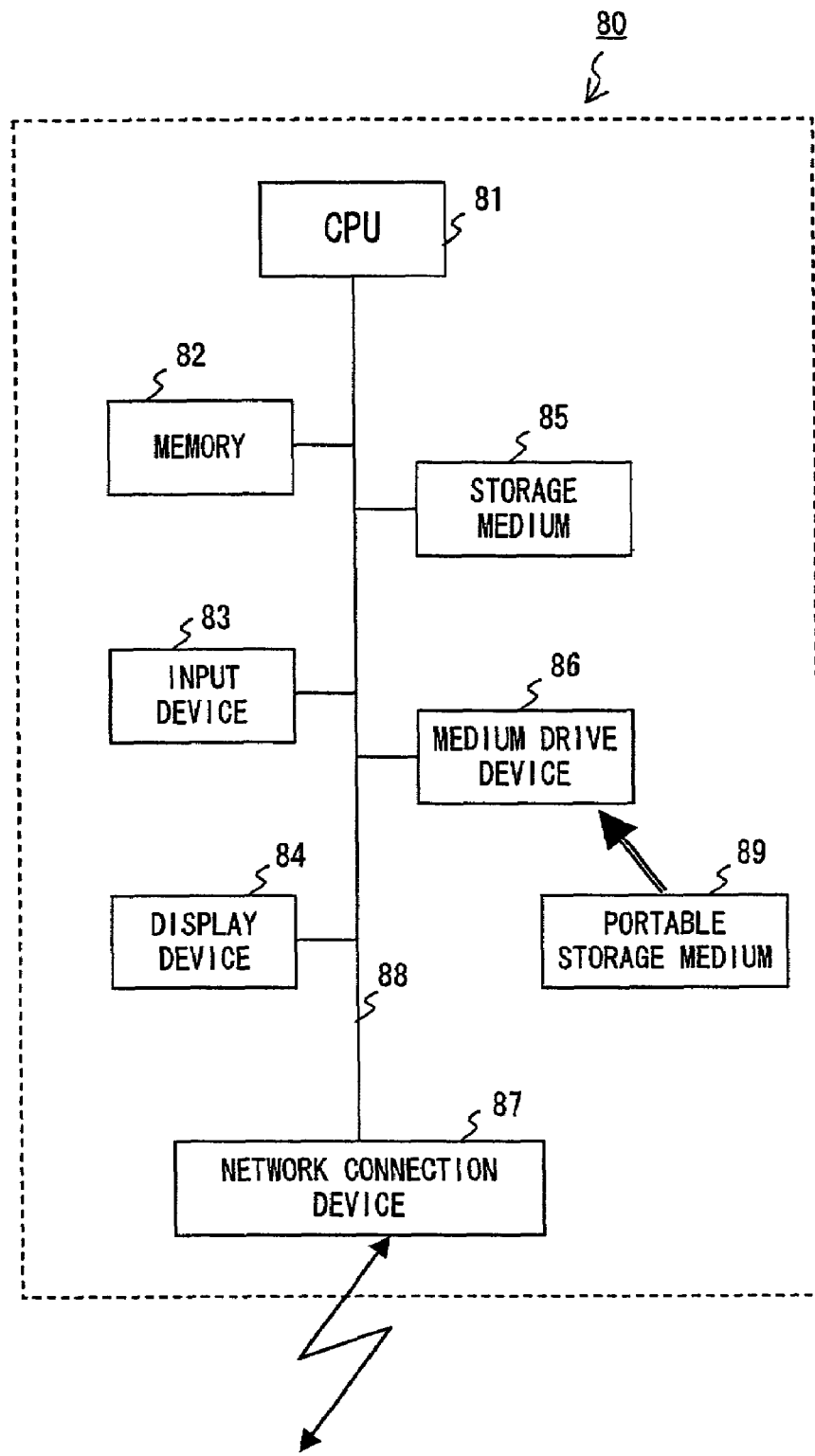
F I G. 1 2

INFORMATION PROCESSING APPARATUS, POWER SUPPLY CONTROL METHOD FOR PLURAL INFORMATION PROCESSING APPARATUSES, AND STORAGE MEDIUM THEREFORE

BACKGROUND OF THE INVENTION

1. Field of the Invention

The present invention relates to a centralized management/control method for the power ON/OFF schedule of a plurality of computers in a system in which the plurality of computers are connected to a network.

2. Description of the Related Art

Conventionally, the power of a computer is automatically turned ON/OFF according to a predetermined schedule in an automatic power supply control method. This method is used to make a schedule of a series of operating jobs from the power-up in the server to the activation and stop of an application, and the power-up, and to save the labor and resources required to operate the server (automatic operation).

FIG. 1 shows the conventional automatic power supply control method.

With the configuration shown in FIG. 1, a power supply control device 102 is connected to a single computer 101. The power supply control device 102 can be an exclusive device, and can be configured to have the function of control the power supply by, for example, a UPS (uninterruptible power supply also referred to as a standby power supply device), etc.

The computer 101 is provided with a power supply schedule software 103. When a user optionally operates an input device (keyboard, mouse, etc.) of the computer 101 not shown in the attached drawings, and activates the power supply schedule software 103, the settings input screen (not shown in the attached drawings) of a power supply schedule is displayed. On the settings input screen, the user defines (inputs the settings of) a power supply schedule (power-up date and time, shutdown/power-down date and time, etc.) or a 'wait event' for extending the shutdown.

The 'wait event' refers to the state in which the computer 101 can safely shut down. For example, an operation job can terminate, a database can be completed, etc. Therefore, if the 'wait event' has not occurred although the power-down date and time has come, then it is necessary to extend the power-down date and time without performing the shutdown process. An example of the above mentioned 'wait event' can be an 'end of operation job' and an 'end of database' because the computer 101 is not fundamentally operated by a person, but automatically continues executing jobs according to a predetermined job schedule during the operating time. However, it is not limited to these applications.

The above mentioned power supply schedule can be set for several weeks or months, and for a plurality of dates and times.

After the above mentioned settings are input, the power supply schedule software 103 enters a wait state until the earliest date and time in the shutdown/power-down dates and times. If the power-down date and time has come, the power supply control device 102 is instructed to indicate the next power-up date and time and perform a shut down process in several minutes according to the defined power supply schedule unless it is necessary to extend the power-down date and time after confirming that the 'wait event' for extension of shutdown has occurred. Furthermore, the OS (operating system) of the computer 101 is instructed to perform a shutdown process. The power-down process is to be performed in several minutes to prevent the power-down from being performed before the completion of the shutdown. Thus, the OS of the computer 101 is shut down, and is then the power-down process is performed by the power supply control device 102. The power supply control device 102 obviously stores the indicated next power-up date and time in the internal memory, etc.

Then, if the stored next power-up date and time has come, the power supply control device 102 performs the power-up process such as energizing, etc. Through the power-up, the computer 101 can be activated.

As described above, although there has been a conventional management system for an automatic power supply schedule of a single computer, there has no management system for an automatic power supply schedule of a system involving a plurality of computers. A system involving a plurality of computers refers to, for example, a client/server system, and specifically a system, etc. in which the plurality of computers perform a formatted job in cooperation with one another according to the schedule of a predetermined job. In this system, it is desired that the processes of power-up, system activation, activation of a job application, stopping the job application, shutdown, and power-down can be automatically operated by calendar control. In addition, for example, there are some multiserver systems for a large amount of access at several sites through Internet. In the multiserver system, an automatic power supply schedule management system is requested to perform the power-down process when a power supply ON/OFF scheduling process is performed on each server each week (for example, to stop the operations on Sundays, etc.), during the periodic maintenance, at the beginning and the end of a year, etc.

There are the following methods 1 and 2 with the management systems for an automatic power supply schedule of a system involving the plurality of computers taken into account.

Method 1

The management system for an automatic power supply schedule of a single computer is applied as is. That is, each computer is provided with the power supply control device 102 and the power supply schedule software 103 for individual management of the power supply schedule.

Method 2

This method is described below by referring to FIG. 2.

In FIG. 2, a plurality of computers 111, 121, 131, and 141 are provided with power supply control devices 112, 122, 132, and 142. They are connected to a network not shown in the attached drawings, and can be communicated to one another.

One of the plurality of computers 111 through 141 is a representative computer, and the representative computer collectively manages/controls the power supply ON/OFF scheduling of all other computers including itself. In the example shown in FIG. 2, the computer 111 is the representative computer.

The representative computer 111 comprises a power supply scheduling unit 111a which collectively manages/controls the power ON/OFF scheduling (to be defined by a manager, etc.) of the representative computer 111 itself and another computer. That is, the power supply scheduling unit 111a requests other computers 121 through 141 to perform the power-down process each time a defined power-down date and time is received according to a predetermined schedule. Correspondingly, each of the computers 121, 131, and 141 instructs each of the power supply control devices 122, 132, and 142 to perform the power-down process and power down each device. Then, the power supply scheduling unit 111a notifies its own power supply control device 112 of the next power-up date and time, instructs it to enter the date and time, performs the power-down process, and powers down itself.

When an entered power-up date and time comes, the power supply control device 112 powers up the computer 111. Thus, when the computer 111 is activated, the power supply scheduling unit 111a instructs each of the power supply control devices 122, 132, and 142 of other computers to perform the power-up process. Thus, each of the computers 121, 131, and 141 is powered up.

There have been the following problems (a) through (c) with the above mentioned method 1.

(a) Since a power supply schedule has to be defined/managed in each computer, the setting/amending operations for the power supply schedule increases, thereby easily inviting a human error. Especially when the power-up/power-down timings of computers are related to one another (when it is necessary to perform the power-up/down processes in a specific order, for example, when it is necessary to first activate a printer server in a plurality of servers on startup), different power-up dates and times are to be set, and not only generating a single power supply schedule and copying it for all computers, but also other processes are required.

(b) Normally, the clock function built in the computer and the power supply control device more or less invites errors. Therefore, unless the clock built in each computer and supply control device substantially matches each other, there can be inconsistency regarding to activation/disconnection. For example, assume that there are computers A and B, the computer B is to be activated after the computer A, and the startup time of the computer A is 6:30 and the startup time of the computer B is 6:32. However, if the clock of the computer B is 3 minutes fast, then the computer B is first activated, thereby disordering the activation sequence.

(c) The 'wait event' for extension of the shutdown process is intended only for the own-device, but not for other devices. Therefore, for example, among the systems working in cooperation with one another, although the shutdown of one computer is extended, and the resources of the own device are to be used, there can be the possibility of shutdown.

On the other hand, there is a similar problem to above-mentioned problem(c) with the above mentioned method 2.

Furthermore, in the method 2, when the computer 111 is not activated for any reason, there can be the possibility that other computers also cannot be activated.

SUMMARY OF THE INVENTION

The present invention aims at providing a supply control method for a plurality of information processing devices, for use with a configuration in which the automatic power supply ON/OFF schedules of a plurality of computers are collectively managed/controlled by a representative computer, capable of activating computers although a representative computer becomes faulty, and performing startup/power-down process in a specific order with possible errors, etc. in the clock. In the supply control methods for a plurality of information processing devices according to the present invention, the first method is a power supply control method for use in a system in which a power supply control device is provided for each of the information processing devices connected to a network. An arbitrary information processing device of the plurality of information processing devices instructs each power supply control device of other information processing devices to perform a power-up process each time it is activated according to the predetermined power-up/down schedule of its own and other information processing devices, notifies other information processing devices of the next power-up date and time together with a power-down instruction each time the power-down date and time comes, and allows each power supply control device to enter the next power-up date and time. When each of the power supply control devices of other information processing devices receives the power-up instruction or the entered power-up date and time comes, it performs the power-up process.

In the power supply control methods for a plurality of information processing devices according to the present invention, the second method is a power supply control method for use in a system in which a power supply control device is provided for each of the information processing devices connected to a network. An arbitrary information processing device of the plurality of information processing devices instructs each power supply control device of other information processing devices to perform a power-up process each time it is activated according to the predetermined power-up/down schedule of its own and other information processing devices, notifies each power supply control device of other information processing devices of the next power-up date and time and has it enter the date and time each time the power-down date and time comes, and issues a power-down instruction to each information processing device.

When each of the power supply control devices of other information processing devices receives the power-up instruction or the entered power-up date and time comes, it performs the power-up process. According to the power supply control method for a plurality of information processing devices in the above mentioned first or second method, each power supply control device of other information processing devices enters the next power-up date and time in the power-down process so that other information processing devices can be activated when a power-up instruction is not issued because an abnormal condition, for example, in which any information processing device cannot be activated for any reason, occurs when the next power-up date and time comes.

Furthermore, for example, the next power-up date and time given to each power supply control device of other information processing devices can be the date and time obtained by any information processing device or each information processing device adding any margin to the power-up date and time in the power-up/down schedule set in advance.

Thus, for example, in consideration of the case in which the clock of each power supply control device of other information processing devices is a little fast (or behind), the power-up process can be performed when there is no power-up instruction even after, for example, about ten minutes have passed from the original power-up date and time. Thus, when the representative information processing device is normally activated, the event that the system is activated earlier than a scheduled date and time and the defined activation order cannot be guaranteed can be avoided.

BRIEF DESCRIPTION OF THE DRAWINGS

FIG. 3 is a general view of the system for performing an automatic power supply schedule of a plurality of computers;

FIG. 4A shows the definition of an automatic power supply schedule;

FIG. 4B shows an example of a supply control target computer-defined file;

FIG. 5 shows an example of a schedule definition setting screen;

FIG. 8 is a flowchart for explanation of a normal power-up process;

FIG. 9 is a flowchart for explanation of an abnormal power-up process;

FIG. 11 is a flowchart for explanation of another example of the power-down process;

FIG. 12 shows an example of the hardware configuration of a computer; and

DESCRIPTION OF THE PREFERRED EMBODIMENTS

Figure 1:
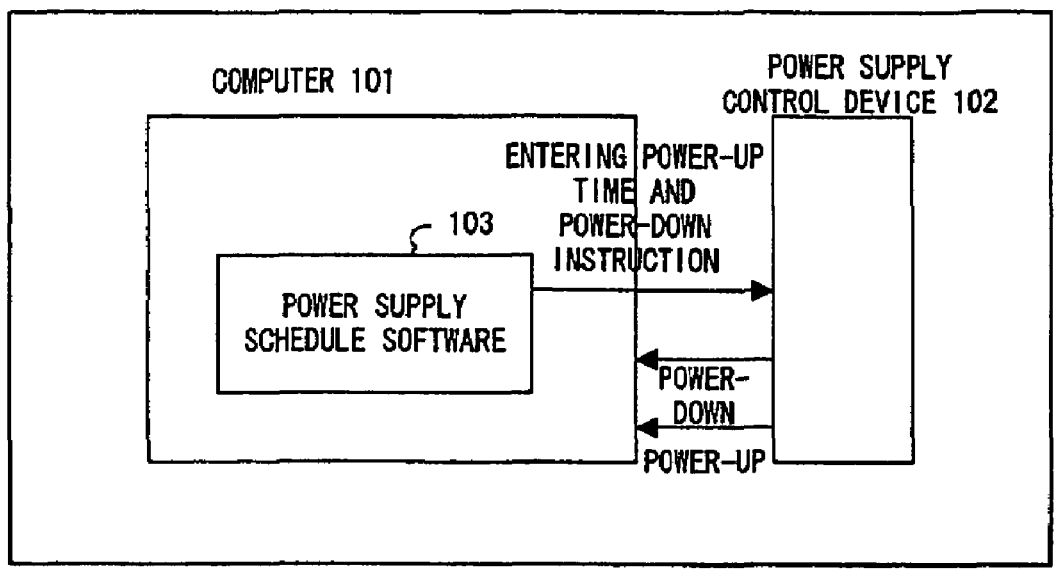
FIG. 1 shows the conventional automatic supply control method.
Figure 2:
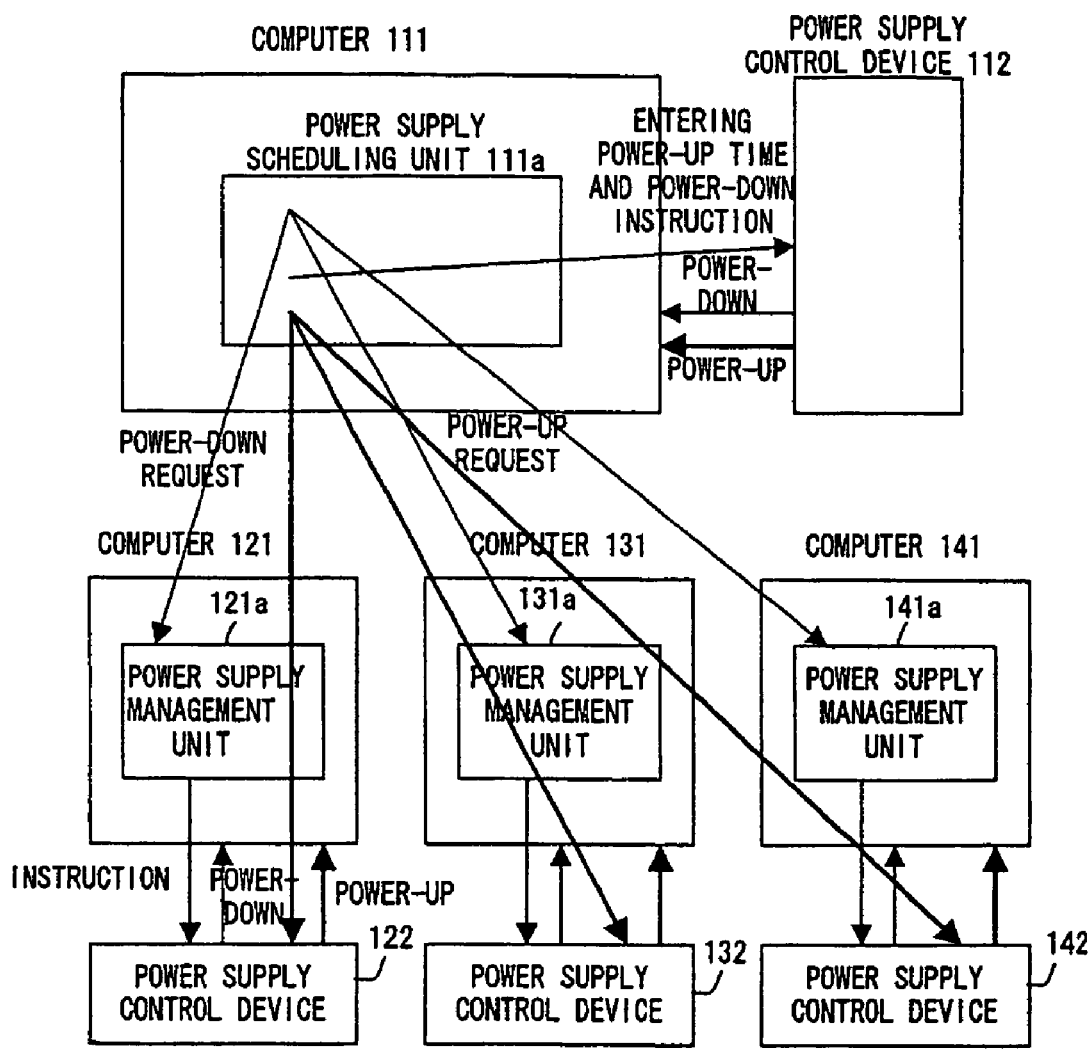
FIG. 2 shows a conventional example of the system for performing an automatic power supply schedule for a plurality of computers.

The embodiments of the present invention are described below by referring to the attached drawings.

FIG. 3 is a general view of the system for performing an automatic power supply schedule of a plurality of computers according to the present invention. FIG. 3 shows a system in which computers 11, 21, 31, and 41 are connected to a network (LAN, etc.) not shown in the attached drawings. Each of the supply control devices 12, 22, 32, and 42 is also connected to the network not shown in the attached drawings. The communications between computers or between the computer 11 and each of the supply control devices 22, 32, and 42 through the network not shown in the attached drawings are performed through, for example, an Ethernet protocol.

First, any computer of the plurality of computers 11 through 41 can be a representative computer, and the representative computer is allowed to collectively manage/control the automatic power ON/OFF schedule of its own and other computers. In FIG. 3, the computer 11 functions as a representative computer.

The computer 11 comprises a power supply schedule management/control unit 11a, and collectively manages/controls the power supply schedule (date and time on which the power is turned ON/OFF) of its own device and other computers 21, 31, and 41. The power supply schedule management/control unit 11a requests the other computers 21, 31, and 41 to power them down each time the power-down date and time comes according to a predetermined power supply schedule. At this time, the next power-up date and time is noticed. Upon receipt of the notification, power supply management units 21a, 31a, and 41a of each of the computers 21, 31, and 41 have their own supply control devices 22, 32, and 42 enter the power-up dates and times, and instruct them to perform the power-down process. Thus, the supply control devices 22, 32, and 42 power down the computers 21, 31, and 41 respectively. In addition, the power supply schedule management/control unit 11a of the computer 11 has the supply control device 12 enter the power-up date and time, and instructs it to perform the power-down process. Thus, the supply control device 12 powers down the computer 11.

The power-up date and time entered by the supply control device 12 is set such that the supply control device 12 can be powered up a little earlier than the other supply control devices 22, 32, and 42. Thus, the power-up date and time entered in the supply control device 12 comes first, and the supply control device 12 powers up the computer 11. When the computer 11 is activated, the power supply schedule management/control unit 11a first requests each of the supply control devices 22, 32, and 42 to perform the power-up process.

Thus, the supply control devices 22, 32, and 42 power up the computers 21, 31, and 41 respectively. If the computer 11 cannot be activated for any reason, then the supply control devices 22, 32, and 42 power up the computers 21, 31, and 41 respectively when the entered power-up date and time comes during power-down.

Thus, in the automatic power supply scheduling method according to the present invention, the event that the other computers 21, 31, and 41 cannot be powered up can be avoided although the representative computer 11 cannot be activated. For example, in a system in which a formatted job process is performed by a plurality of computers, although a computer cannot be activated, another computer can replace the computer, thereby preventing the trouble.

In the above explanation, the representative computer 11 starts the power-down process when the power-down date and time comes, but the power-down process can be set to be performed only after the 'event' predetermined by all computers including the computer 11 has occurred although the power-down date and time comes (such that the shutdown can be extended). Furthermore, each computer can be set to be powered down or up at predetermined time intervals. The details are described later.

FIG. 4 shows the definition of the automatic power supply schedule.

A schedule definition 50 shown in FIG. 4 comprises a startup/power-down time 51, a computer name 52 to be controlled in synchronization, and an event name 53 awaiting the shutdown.

Although the same startup/power-down time 51 is defined every day in this example (startup at 6:00 and power-down at 20:00), the settings are not limited to these values. For example, it can be newly set every week as on a schedule definition setting screen 60 shown in FIG. 5, and can be configured, and also can be newly set every day.

In the example shown on the schedule definition setting screen 60 in FIG. 5, an operation time setting area 61, an 'operation' button 62, an 'OFF' button 63, a 'reboot' button 64, etc. can be displayed. For example, when a user, etc. specifies a desired operation time period, he or she specifies a desired time period in the operation time setting area 61 after specifying the 'operation' button 62. Similarly, a shutdown time period and a reboot time can be specified by operating the 'OFF' button 63 and the 'reboot' button 64 respectively. The definition of a schedule in the example shown in FIG. 5 is activated at 6:00 and powered down at 20:00 on Monday, Tuesday, and Thursday every week. For example, on Saturday, the system is set to be activated at 6:00, suspended at 12:00, then activated again at 16:00, and powered down at 20:00. Each computer name 52 to be controlled in synchronization is formed by a computer name 52a (which can be an identifier such as an ID, etc.), a startup interval 52b, a power-down interval 52c, and an IP address 52d of the supply control device in this example.

The computer names 52a are linked with one another (including the computer 11). For example, the name, the identifier, etc. of a computer for performing a formatted job process, etc. are defined. Thus, it is desired that a plurality of computers linked with one another are also linked in the power ON/OFF control. In the present embodiment, the computers 21, 31, and 41 are entered as the computers which are linked in control, and are collectively managed/controlled in the power ON/OFF process by the computer 11 (the computers can be hereinafter referred to as a 'target computer').

The startup interval 52b is defined when the computers 21, 31, and 41 are to be activated in order at arbitrary time intervals. The power-down interval 52c is similarly defined. Therefore, they are not necessarily defined.

The computers are activated in order from top to bottom. In the example shown in FIG. 4A, after the computer 11 is activated, the computers 21, 31, and 41 are activated in this order. On the other hand, they are powered down in order from the computers 41, 31, and 21.

The startup interval 52b='3 minutes' for the computer 21 means that the computer 31 is activated 3 minutes after the computer 21 is activated. Similarly, the computer 41 is set to be activated two minutes after the computer 31 is activated. Since no computer is activated after the computer 41, the startup interval 52b is not set for the computer 41.

As for the power-down intervals, the computer 31 (also the computer 21 in this example) is set to be powered down one minute after the computer 41 is powered down. Intervals are not necessarily set among the computers for the startup/power-down process. If they are not set, '0 minute' is set as shown in FIG. 4A.

FIG. 4A shown only an example. For example, the startup interval 52b='3 minutes' for the computer 21 means that the computer 21 is activated 3 minutes after the computer 11 is activated (in this case, the startup interval 52b for the computer 41 is also to be set).

In addition, the IP address assigned to each supply control device is defined to the IP address 52d of the supply control device. Normally, although the IP address of each of the computers 11 through 41 is entered (since it is a matter of fact, it is not specifically shown or described), the IP address of the supply control device itself is not entered. Therefore, it is defined below.

The representative computer 11 can issue a power-up instruction, a power-down instruction, etc. directly to each supply control device using the IP address 52d of the supply control device.

The set contents are stored in a supply control target computer definition file 54 as shown in FIG. 4B. In FIG. 4B, for example, 'COMPUTERB' is an example of an actual computer name (or identifier) of the computer 21. In addition, although not shown in the attached drawings, a definition file for correspondence between the IP address of each computer and the computer name is also stored.

Figure 6:
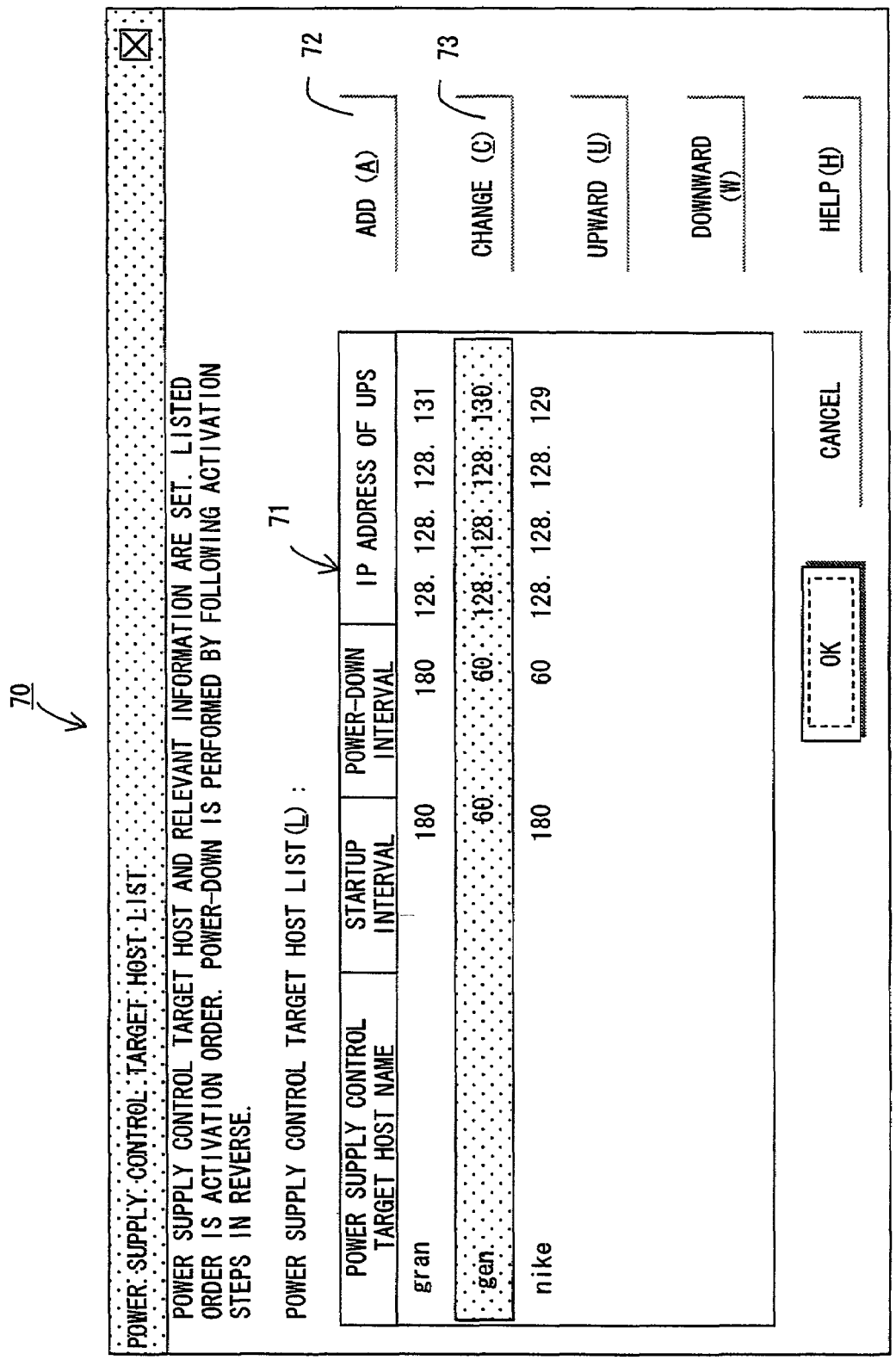
FIG. 6 shows an example of a setting screen used by a user defining the name of a computer to be controlled in synchronization.

FIG. 6 shows an example of a setting screen for allowing a user to define the computer names 52 to be controlled in synchronization.

Figure 7:
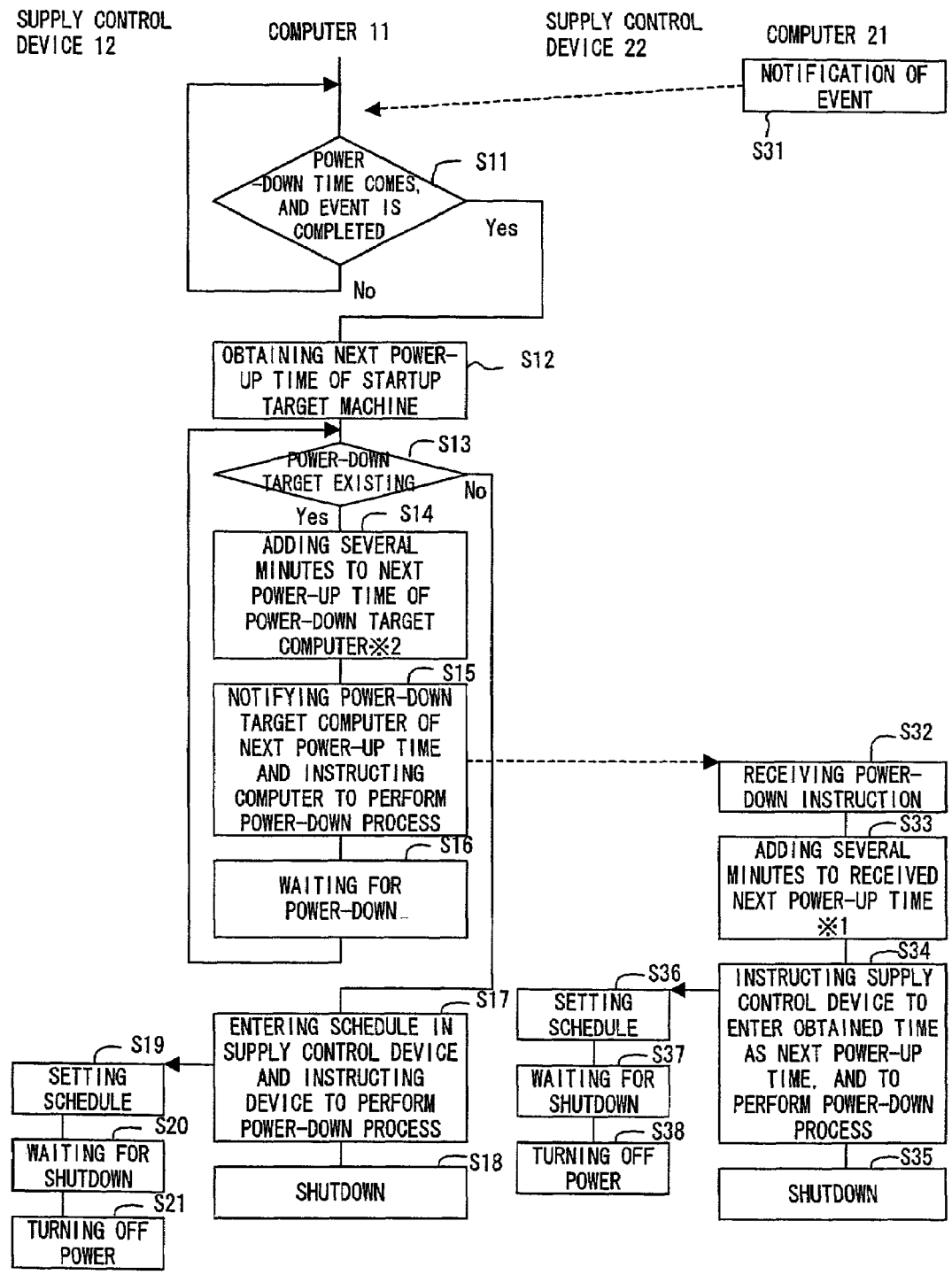
FIG. 7 is a flowchart for explanation of an example of a power-down process.

On a setting screen 70, the user first specifies, for example, an 'add' button 72, a 'change' button 73, etc. and then sets/inputs the name of the host to be power-controlled, the startup interval, the power-down interval, the IP address 52d of the UPS (supply control device), etc. in a setting input area 71. The unit of the values of the startup interval and the power-down interval is 'second'. In FIG. 4, a condition name (in the example shown in FIG. 4, the end of the database, the end of the operation job, and other information such as waiting for the output of the printer, etc.) indicating that it is time to enter a power-down state is entered for each computer in an event name 53 which is waiting for shutdown. Although not shown in the attached drawings or described in detail, a 'waiting event name' of its own computer is also entered as in the conventional technology. Thus, according to the present embodiment, by entering the 'waiting event name' of not only the own computer but also other computers to be power ON/OFF controlled in synchronization, the shutdown process is not performed until a 'waiting event' occurs in all computers (until it is time to enter a shutdown state) although the power-down date and time has come. That is, a 'wait event' refers to also a power-down permission condition. FIG. 7 is a flowchart for explanation of an example of a power-down process in the system shown in FIG. 3.

Although FIG. 7 shows only the computer 21 (and its supply control device 22) as another computer which is managed/instructed by the representative computer 11 for its power supply schedule. Similar processes are performed on other computers 31 and 41. This is the same in FIG. 8 through FIG. 11.

In FIG. 7, when a predetermined event (the event name 53 waiting for shutdown) occurs during the operation, the computer 21 (as in the computers 31 and 41) notifies the representative computer 11 of the occurrence (step S31).

Although not shown in FIG. 7, upon receipt of the notification, the computer 11 temporarily records that the event has occurred in the computer 21. The computer 11 normally performs its own job process, etc. until a predetermined power-down time comes (NO in step S11), and temporarily stores it each time another computer notifies the computer 11 of the occurrence of an event (or when an event occurs in the computer 11). If the power-down time comes, the computer 11 determines whether or not events have occurred (been completed) in all computers. If not (NO in step S11), the computer 11 waits until the events have been completed (extends the shutdown).

If the power-down time has come, and the events have been completed in all computers (YES in step S11), then the power-down process described below is performed.

The processes are not limited to the above mentioned example. For example, the power-down process can be started when the power-down time comes without considering the completion of an event. If a new process occurs after receipt of the notification of the occurrence of an event in another computer, then a notification of the deletion of the occurrence of the event is issued, and a notification of the occurrence of the event is issued again upon completion of the new process. Otherwise, if the power-down time has come, not when another computer issues an event occurrence notification by itself, then the computer 11 can issue an inquiry to another computer.

First, the computer 11 refers to a startup/power-down time 51 and a computer name 52 to be controlled in synchronization in the above mentioned schedule definition 50, and obtains the next power-up time of each computer for managing a power supply schedule (step S12). In the example shown in FIG. 4A, the power-up time is 6:00 for the computers 11 and 21, 6:03 for the computer 31, and 6:05 for the computer 41.

Then, the processes in steps S14 to S16 are performed on all computers to be managed for power supply schedules (step S13).

That is, an appropriate margin (predetermined by an operator, etc., or optionally determined by a computer, and assumed to be 10 minutes in the present embodiment) is allowed for the next power-up time obtained in step S12 for a target computer (step S14). That is, the next power-up time is given in step S15 for use in case the computer 11 cannot be activated. For example, when the supply control device 32 of the computer 31 enters '6:03' as the next power-up time, the supply control device 32 can activate the computer 31 before the computer 11 instructs it to perform the power-up process for any reason (for example, the clock is a little fast) although the computer 11 is normally activated. To avoid such an error (the power-up process cannot be performed in the defined order), an appropriate margin is allowed.

The processes in steps S14 and S33 cannot be simultaneously performed. That is, the process of allowing a margin for the next power-up time can be performed by the representative computer 11 or each of the computers 21, 31, and 41 whichever can be predetermined before a program is generated.

In addition, the processes in steps S14 and S33 are not necessarily required. For example, if a value of a predetermined power-up/down interval includes an allowed margin, they are not required (however, in this case, a user, etc. has to perform a setting operation with the margin taken into account).

Then, the computer 11 requests a target computer to perform a power-down process through a network not shown in the attached drawings, and notifies the target computer of the next power-up time (if the computer 11 adds a margin, then the value contains the margin)(for example, in the parameter form).

After the time interval defined according to the power-down interval 52c (step S16), the processes in steps S14 through S16 are performed if the next target computer exists.

The processes in steps S14 through S16 are explained below by referring to the example shown in FIG. 4A. As described above, the power-down process is performed by following the power-up process steps in reverse. Therefore, the computer 41 is processed first. Since the power-up time of the computer 41 is 6:05, if a margin(10 minutes) is added in step S14, the power-up time notified for the computer 41 in step S15 is 6:15, which is given to the computer 41 that is requested to perform the power-down process. Then, after one minute, the process is started on the computer 31.

When the processes on all target computers are completed (NO in step S13), the computer 11 notifies its supply control device 12 of the power-up time, and instructs it to perform the power-down process (step S17), thereby performing the shutdown process (step S18).

The supply control device 12 stores the received next power-up time in the internal memory not shown in the attached drawings (step S19). Then, after a period (several minutes) predetermined such that the power cannot be turned off before the shutdown is completed (step S20), the computer 11 is turned off (step S21).

On the other hand, upon receipt of the next power-up time notification and the power-down instruction in step S15 (step S32), each of the computers 21, 31, and 41 performs the process of allowing a margin at a received next power-up time then it is designed that the representative computer does not perform the process in step S14 (step S33).

Then, the next power-up time assigned a margin in step S14 or S33 is given to the supply control device (the supply control device 22 in the example shown in FIG. 7) of the computer, and the power-down instruction is issued (step S34). Then, the shutdown process is performed (step S 35).

The supply control device 22 stores the received next power-up time in the memory, etc. (step S36) Then, after a predetermined period (several minutes) such that the power cannot be turned off before the shutdown is completed (step S37), the power-down process is performed on the computer 21 (step S38). The similar processes are performed on other supply control devices 32 and 42.

When the processes are performed according to the defined example shown in FIG. 4A, the power is sequentially turned off in order from the computer 41 finally to the computer 11.

The process associated with the power-up process performed when the next power-up date and time comes after the above mentioned power-down process is performed, and the power is turned off for each of the computers 11 through 41 is described below by referring to FIGS. 8 and 9. FIG. 8 is a flowchart for explanation of the power-up process in the normal operation. FIG. 9 is a flowchart for explanation of the power-up process in the abnormal condition (when the representative computer 11 is in an abnormal condition).

First, the power-up process in the normal operation is described by referring to FIG. 8.

First, the supply control device 12 of the representative computer 11 starts turning on the computer 11 when the entered power-up date and time comes (step S41).

When the computer 11 is activated (step S42), the power supply schedule management/control unit 11a reads the supply control target computer definition file 54, for example, shown in FIG. 4B (step S43), and sequentially issues a power-up instruction to the supply control devices for each of the supply control target computers defined in the definition file 54 (step S45). If the startup interval is set, the process on the next supply control target computer is started after the startup interval (step S46). If there is no more power-up target (NO in step S44), then the process terminates. The destination of the instruction in step S45 can be obtained by referring to the IP address of the supply control device of the supply control target computer definition file 54.

Upon receipt of the power-up instruction by step S45, each of the supply control target computers of the supply control devices 22, 32, and 42 starts turning on its own computer (step S47). Thus, each of the computers 21, 31, and 41 is activated (possibly at the startup interval) (step S48).

Next, the power-up process performed when an abnormal condition occurs is described below by referring to FIG. 9.

When the entered power-up date and time comes, the supply control device 12 of the representative computer 11 first starts turning on the computer 11 (step S41).

Assume that the computer 11 cannot be activated for any reason although the computer 11 can be normally activated. In this case, it is obvious that the processes in steps S43 through S46 are not performed (as indicated by the big x mark shown in FIG. 9). Therefore, the time passes with the power-up instruction to each of the supply control devices 22, 32, and 42 withdrawn. Then, if each of the supply control devices 22, 32, and 42 determines that the power-up date and time entered in step S36 has come, then its own computer is turned on (step S49). Thus, each of the computers 21, 31, and 41 can be activated although the computer 11 is in an abnormal condition and the activation is realized a little after the original power-up time (delayed by the margin added in step S14 or S33) (step S48).

Figure 10:
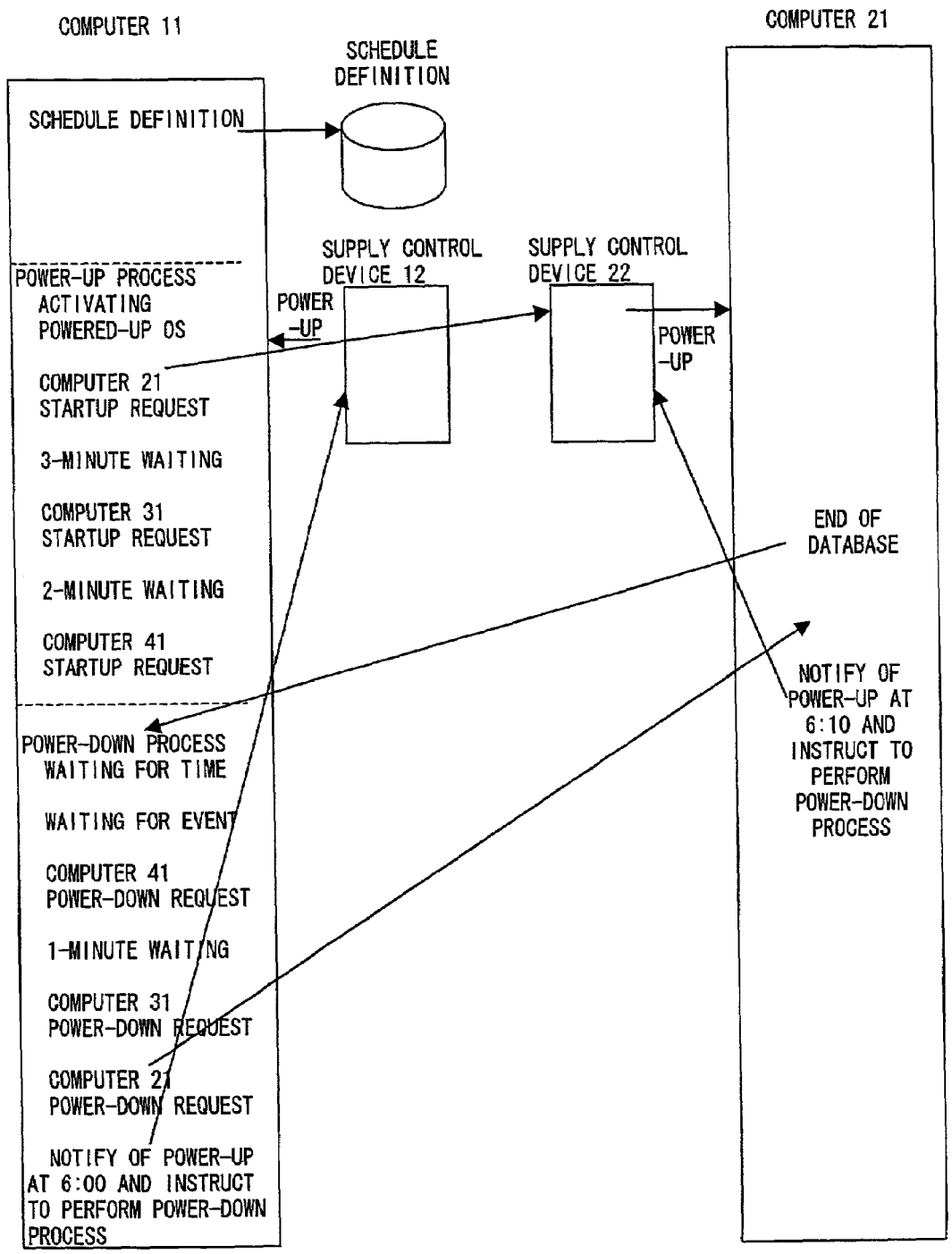
FIG. 10 shows a general view of the flow of a power-up/down process based on the definition sample shown in FIG. 4A.

FIG. 10 is a general view of the above mentioned process flow of the case in which the definition shown in FIG. 4A is set.

In FIG. 10, the definition of the schedule in the computer 11 is shown in FIG. 4A as described above. The supply control device 12 powers up the computer 11 if the power-up date and time (6:00) notified and entered during power-down comes. Thus, the computer 11 activates the OS, and requests the supply control device 22 to perform the power-up process based on the definition shown in FIG. 4A. At the request, the supply control device 22 powers up the computer 21.

After the defined startup interval=3 minutes, the computer 11 requests the supply control device 32 to perform the power-up process. Furthermore, after another startup interval=2 minutes, it requests the supply control device 42 to perform the power-up process. At the request, the supply control devices 32 and 42 power up the computers 31 and 41 respectively.

After the activation, the computers 11 through 41 perform their respective processes. When the 'wait event for shutdown' is completed, they notify the computer 11 of the completion. In the example shown in FIG. 10, the computer 21 notifies the computer 11 of the end of the database.

The computer 11 starts the power-down process when the next power-down date and time comes and all computers notify the computer 11 that the 'wait event for shutdown' has been completed.

In this case, the process of assigning a margin is performed by each of the computers 21, 31, and 41 (that is, the process in step S14 shown in FIG. 7 is not performed, but the process in step S33 is performed).

According to the definition shown in FIG. 4A, the computer 11 first requests the computer 41 to perform the power-down process, and notifies the computer 41 of the next power-up date and time (6:05). The computer 41 notifies the supply control device 42 of the next power-up date and time (6:15) obtained by adding a predetermined margin (10 minutes) to the power-up date and time (6:05), and simultaneously instructs it to perform the power-down process. After the defined startup interval=1 minute, the computer 11 requests the computers 31 and 21 to perform the power-down process. The next power-up date and time given then is 6:03 for the computer 31, and 6:00 for the computer 21.

The computer 31 notifies the supply control device 32 of the next power-up date and time (6:13) obtained by adding a predetermined margin (10 minutes) to the power-up date and time (6:03), and simultaneously instructs it to perform the power-down process.

The computer 21 notifies the supply control device 22 of the next power-up date and time (6:10) obtained by adding a predetermined margin (10 minutes) to the power-up date and time (6:00), and simultaneously instructs it to perform the power-down process. Normally, the supply control device 22 activates the computer 21 at a request from the computer 11 sometime after the computer 11 is powered up at 6:00 (after a period required for the startup process of the computer 11). If 6:10 comes without receipt of the request, the computer 21 is activated.

FIG. 11 is a flowchart for explanation of another example of the power-down process in the system shown in FIG. 3.

In FIG. 11, the processes similar to those shown in FIG. 7 are assigned the same step numbers. The processes in steps S31 and S11 shown in FIG. 7 are omitted in FIG. 11, but are also performed in FIG. 11. As in the above mentioned processes, the computer whose power supply schedule is to be controlled is the computer 21 and the supply control device 22 for example.

In FIG. 11, the explanation of steps S12 and S13 are omitted.

If there is a target of power-down (YES in step S13), the next power-up time obtained in step S12 for the target computer 21 is assigned a small margin (10 minutes in this example) (step S51). This process is the same as the process in step S14, but is not assigned the same step numbers because, in this example, the process in step S33 is omitted. Next, the supply control device 22 of the target computer 21 is notified of, and sets, the next power-up date and time obtained by adding the margin in step S51 (step S52).

Then, a power-down instruction is issued to the target computer 21 (step S53). Upon receipt of the power-down instruction (step S55), the computer 21 instructs the supply control device 22 to perform the power-down process (step S56), and performs shutdown (step S35).

On the other hand, upon receipt of the notification in step S52, the supply control device 22 enters the next power-up date and time, and enters the standby state. Then, upon receipt of the power-down instruction in step S56, and after a time (several minutes) predetermined such that the power-down process cannot be performed before the completion of shutdown (step S37), the supply control device 22 powers down the computer 21 (step S38).

Thus, in the present embodiment, the representative computer 11 instructs the supply control device of a control target computer to set the next power-up date and time. Thus, the function of the power supply management units 21a, 31a, and 41a of the computers 21, 31, and 41 respectively can be the function of only performing the shutdown process after instructing its own supply control device to perform the power-down process, thereby simplifying the function of the power supply schedule in the computers other than the representative computer. FIG. 12 shows an example of the hardware configuration of a computer.

A computer 80 shown in FIG. 12 comprises a CPU 81, memory 82, an input device 83, a display device 84, a storage device 85, a medium drive device 86, a network connection device 87, etc. These components are interconnected through a bus 88. The configuration shown in FIG. 12 is an example, and the present invention is not limited to this configuration.

The CPU 81 is a central processing unit for controlling the entire computer 80.

The memory 82 can be RAM, etc. for temporarily storing a program or data stored in the storage device 85 (or a portable storage medium 89) when the program is executed and data is updated, etc. The CPU 81 performs the above mentioned processes using the program/data read to the memory 82.

The input device 83 can be, for example, a keyboard, a mouse, etc., and has the configuration with which the user can input data on the setting screen, etc. as shown in FIGS. 5 and 6.

The display device 84 can be, for example, a display, etc., and displays the setting screen, etc. as shown in FIGS. 5 and 6.

The storage device 85 can be, for example, a magnetic disk device, an optical disk device, a magneto-optic disk device, etc. and stores a program, data, etc. for realizing the supply control method for the above mentioned plurality of information processing devices.

The medium drive device 86 reads the program/data, etc. stored in the portable storage medium 89. The portable storage medium 89 can be, for example, an FD (flexible disk), CD-ROM, a DVD, a magneto-optical disk, etc.

The network connection device 87 is connected to a network, and has the configuration for transmission/reception (notification, etc. of the above mentioned power-up date and time) of data to and from other computers. Furthermore, data can be transmitted/received to and from external information processing devices through an external network (internet, etc.).

Figure 13:
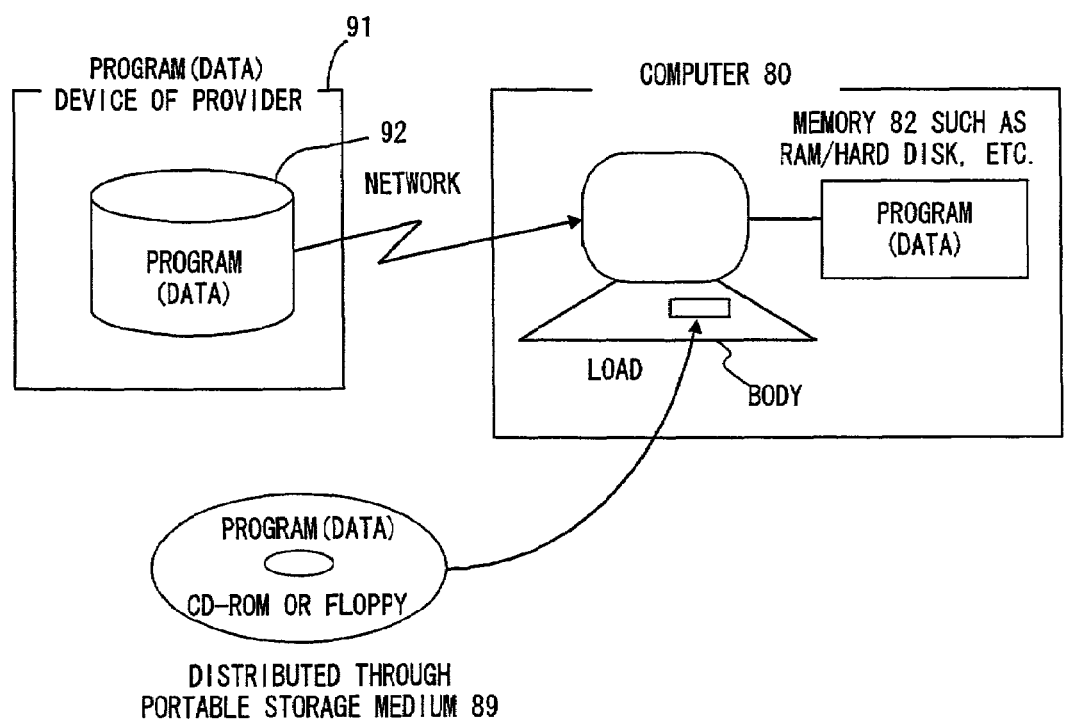
FIG. 13 shows an example of a storage medium.

FIG. 13 shows an example of a storage medium.

As shown in FIG. 13, the above mentioned program/data stored in the portable storage medium 89 can be loaded into the information processing device, stored in the memory 82, and is executed. The above mentioned program/data can be those stored in and downloaded from a storage device 92 of a device 91 of an external information provider. In addition, the present invention can be configured as the above mentioned program itself.

The present invention also can be configured as a transmission signal of the above mentioned program/data, etc. for transmission through a network.

As described above in detail, according to the supply control method for a plurality of information processing devices and the computer system using the method, and with the configuration in which a representative computer collectively manages/controls the automatic power ON/OFF schedule of the plurality of computers, computers can be successfully activated although a representative computer is in an abnormal condition.

Furthermore, even if the clock is fast or slow, the other computers can be powered up/down in a specified order.

In addition, the power-down process can be performed when it is time to perform the power-down process on all computers, and the event in which the power-down process is performed during the operation can be avoided. If the startup/power-down times of each computer are related to one another, the basic startup/power-down times can be set, and the startup interval/power-down interval can be set. That is, it is not necessary to set or amend the startup/power-down times of each computer in the setting or amending process.

What is claimed is:

1. A power supply control method in a system in which a power supply control device is provided for each of a plurality of information processing devices connected to a network, comprising:

a representative information processing device of the plurality of information processing devices normally issuing, according to a predetermined power-up/down schedule of said representative information processing device and other information processing devices, a power-up instruction to each power supply control device of the other information processing devices upon each activation;

notifying each power supply control device of the other information processing devices of a next power-up date and time, having each power supply control device enter the next power-up date and time, and issuing a power-down instruction to each of the other information processing devices each time a power-down date and time comes; and each power supply control device of said other information processing devices performing a power-up process if the entered power-up date and time comes and the representative information processing device abnormally issues no power-up instruction to each power supply control device of the other information processing devices;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

2. A power supply control method in a system in which a power supply control device is provided for each of a plurality of information processing devices connected to a network, comprising:

a representative information processing device of the plurality of information processing devices normally issuing, according to a predetermined power-up/down schedule of said representative information processing device and other information processing devices, a power-up instruction to each power supply control device of the other information processing devices upon each activation;

instructing each of the other information processing devices to perform a power-down process, notifying each of the other information processing devices of a next power-up date and time, and having each power supply control device enter a next power-up date and time each time a power-down date and time comes; and each power supply control device of said other information processing devices performing a power-up process if the entered power-up date and time comes and the representative information processing device abnormally issues no power-up instruction to each power supply control device of the other information processing devices;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

3. The power supply control method according to claim 1, wherein said power-up date and time given to each of said power supply control devices of said other information processing devices is obtained by any of said information processing devices or each of said other information processing devices automatically adding an arbitrary margin to a power-up date and time in said predetermined power-up/down schedule.

4. A power supply control method in a system in which a power supply control device is provided for each of a plurality of information processing devices connected to a network, comprising:

a representative information processing device of the plurality of information processing devices normally issuing, according to a predetermined power-up/down schedule of said representative information processing device and other information processing devices, a power-up instruction to each power supply control device of the other information processing devices upon each activation;

instructing each of the other information processing devices to perform a power-down process, notifying each of the other information processing devices of a next power-up date and time, and having each power supply control device enter a next power-up date and time each time a power-down date and time comes; and each power supply control device of said other information processing devices performing a power-up process if the entered power-up date and time comes and the representative information processing device abnormally issues no power-up instruction to each power supply control device of the other information processing devices;

wherein said representative information processing device does not give the power-down instruction and the next power-up date and time before a power-down permission condition entered in advance of a current and other information processing devices is satisfied although the power-down date and time comes;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

5. A power supply control method in a system in which a power supply control device is provided for each of a plurality of information processing devices connected to a network, comprising:

a representative information processing device of the plurality of information processing devices normally issuing, according to a predetermined power-up/down schedule of said representative information processing device and other information processing devices, a power-up instruction to each power supply control device of the other information processing devices upon each activation;

notifying each power supply control device of the other information processing devices of a next power-up date and time, having each power supply control device enter the next power-up date and time, and issuing a power-down instruction to each of the other information processing devices each time a power-down date and time comes; and each power supply control device of said other information processing devices performing a power-up process if the entered power-up date and time comes and the representative information processing device abnormally issues no power-up instruction to each power supply control device of the other information processing devices;

wherein said representative information processing device does not give the power-down instruction and the next power-up date and time before a power-down permission condition entered in advance of a current and other information processing devices is satisfied although the power-down date and time comes;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

6. The power supply control method according to claim 2, wherein said power-up instruction or power-down instruction is sequentially issued at predetermined startup intervals or power-down intervals.

7. The power supply control method according to claim 1, wherein said power-up instruction or power-down instruction is sequentially issued at predetermined startup intervals or power-down intervals.

8. An information processing apparatus which is a representative information processing device in a plurality of information processing devices in a computer system in which a power supply control device is provided for each of the plurality of information processing devices connected to a network, comprising:

a power-up/down schedule storage unit storing predetermined power-up/down schedules of said representative information processing device and other information processing devices;

a power-up instruction unit normally instructing each power supply control device of other information processing devices to perform a power-up process at each activation process; and a power-down instruction unit instructing each power supply control device to perform a power-down process and notifying each power supply control device of a next power-up date and time each time power-down date and time comes according to said predetermined power-up/down schedule;

wherein each power supply control device performs the power-up process if the power-up date and time comes and the power-up instruction unit abnormally issues no power-up instruction to each power supply control device of the other information processing devices;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

9. The information processing device according to claim 8, wherein said next power-up date and time given to each power supply control device is obtained by any of said information processing devices or each of said information processing devices adding an arbitrary margin to a power-up date and time in a power-up/down schedule stored in said power-up/down schedule storage unit.

10. An information processing device which is a representative information processing device in a plurality of information processing devices in a computer system in which a power supply control device is provided for each of the plurality of information processing devices connected to a network, comprising:

a power-up/down schedule storage unit storing predetermined power-up/down schedules of said representative information processing device and other information processing devices;

a power-up instruction unit normally instructing each power supply control device of other information processing devices to perform a power-up process at each activation process;

a power-down instruction unit instructing each power supply control device to perform a power-down process and notifying each power supply control device of a next power-up date and time each time power-down date and time comes according to said predetermined power-up/down schedule;

a power-down permission condition storage unit for storing a power-down permission condition of a predetermined current and other information processing devices; and does not give the power-down instruction and the next power-up date and time before a power-down permission condition is satisfied although the power-down date and time comes;

wherein each power supply control device performs the power-up process if the power-up date and time comes and the power-up instruction unit abnormally issues no power-up instruction to each power supply control device of the other information processing devices;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

11. The information processing device according to claim 8, wherein said power-up instruction or power-down instruction is sequentially issued at predetermined startup intervals or power-down intervals.

12. A power supply control device in a computer system in which the power supply control device is provided for each of a plurality of information processing devices connected to a network, comprising:

a power-down unit storing a next power-up date and time when the next power-up date and time is received together with a power-down instruction, and performing a power-down process on an information processing device of a current system; and a power-up unit performing a power-up process on the current information processing device if said stored power-up date and time comes and abnormally no power-up instruction is received;

wherein said power-up date and time received by each of said power supply control devices of said other information processing devices is obtained by any of said information processing devices or each of said other information processing devices automatically adding an arbitrary margin to a power-up date and time in a predetermined power-up/down schedule.

13. A computer-readable storage medium storing a program used to direct a computer to realize the functions of:

instructing each power supply control device of other information processing devices to perform a power-up process at each activation process;

instructing each power supply control device to perform a power-down process and notifying each power supply control device of a next power-up date and time each time power-down date and time comes according to a predetermined power-up/down schedule; and performing the power-up process if the power-up date and time comes and abnormally no power-up instruction is received;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

14. A method of directing a computer comprising:

receiving a computer program stored in a computer data signal embodied in a carrier wave;

instructing each power supply control device of other information processing devices to perform a power-up process at each activation process with the computer program;

instructing each power supply control device to perform a power-down process and notifying each power supply control device of a next power-up date and time each time power-down date and time comes according to a predetermined power-up/down schedule; and performing the power-up process if the power-up date and time comes and abnormally no power-up instruction is received;

wherein said power-up date and time given to each of said power supply control devices of said other information processing devices is obtained by any of said information processing devices or each of said other information processing devices automatically adding an arbitrary margin to a power-up date and time in said predetermined power-up/down schedule.

15. A power supply control method for a plurality of information processing devices, comprising:

powering up, by one of said information processing devices, each of the other information processing devices by issuing a power-up instruction to each of the other information processing devices;

notifying, by said one of said information processing devices, each of the other information processing devices of a next power-up date and time;

entering said next power-up date and time in each of the other information processing devices;

instructing, by said one of said information processing devices, each of the other information processing devices to perform a power-down process; and performing a power-up process of each the other information processing devices if the next power-up date and time comes and said one of said information processing devices fails to provide a further power-up instruction;

wherein said power-up date and time given to each of said power supply control devices of said other information processing devices is obtained by any of said information processing devices or each of said other information processing devices automatically adding an arbitrary margin to a power-up date and time in a predetermined power-up/down schedule.

* * * * *